United States Patent [19]

Zones

[11] Patent Number: 4,665,110

[45] Date of Patent: * May 12, 1987

[54] PROCESS FOR PREPARING MOLECULAR SIEVES USING ADAMANTANE TEMPLATE

[75] Inventor: Stacey I. Zones, San Francisco, Calif.

[73] Assignee: Chevron Research Company, San Francisco, Calif.

[*] Notice: The portion of the term of this patent subsequent to Oct. 1, 2002 has been disclaimed.

[21] Appl. No.: 823,700

[22] Filed: Jan. 29, 1986

[51] Int. Cl.$^4$ .............................................. C01B 35/10
[52] U.S. Cl. .................................. 423/277; 423/305; 423/306; 423/328; 423/329; 423/330; 502/60; 502/61; 502/62; 502/74; 502/202; 502/208; 502/213; 502/214

[58] Field of Search ............... 423/305, 306, 277, 326, 423/328, 329; 502/60–62, 77, 74, 202, 208, 214, 213

[56] References Cited

U.S. PATENT DOCUMENTS 4,544,538 10/1985 Zones ................................. 423/326

Primary Examiner—John Doll
Assistant Examiner—Jackson Leeds
Attorney, Agent, or Firm—S. R. LaPaglia; W. K. Turner; V. J. Cavalieri

[57] ABSTRACT

Molecular sieves, particularly zeolites, are prepared using adamantane compounds as templates.

11 Claims, No Drawings

PROCESS FOR PREPARING MOLECULAR SIEVES USING ADAMANTANE TEMPLATE

BACKGROUND OF THE INVENTION

1. Field of the Invention

This invention relates to a new method of preparing crystalline molecular sieve compositions requiring a reaction mixture for crystallization thereof which contains an adamantane compound as a templating agent.

2. Description of the Prior Art

Zeolitic materials, both natural and synthetic, are known to have catalytic capabilities for many hydrocarbon processes. Zeolitic materials typically are ordered porous crystalline aluminosilicates having a definite structure with cavities interconnected by channels. The cavities and channels throughout the crystalline material generally are uniform in size allowing selective separation of hydrocarbons. Consequently, these materials in many instances are known in the art as "molecular sieves" and are used, in addition to selective adsorptive processes, for certain catalytic properties. The catalytic properties of these materials are affected to some extent by the size of the molecules which selectively penetrate the crystal structure, presumably to contact active catalytic sites within the ordered structure of these materials.

The term "molecular sieve" refers to a material prepared according to the present invention having a fixed, open-network structure, usually crystalline, that may be used to separate hydrocarbons or other mixtures by selective occlusion of one or more of the constituents.

The term "zeolite" refers to a molecular sieve containing a silicate lattice, usually in association with some alumina. In the following discussion, the terms molecular sieve and zeolite will be used more or less interchangeably, since most of the work was carried out on zeolites. However, one skilled in the art will recognize that the teachings relating to zeolites are also applicable to the more general class of materials called molecular sieves.

In recent years, many crystalline zeolites having desirable absorption and catalytic properties have been prepared. Typically, zeolites are prepared from reaction mixtures having sources of alkali or alkaline earth metal oxides, silica, and alumina. More recently, "nitrogenous zeolites" have been prepared from reaction mixtures containing an organic species, usually a nitrogen compound. Depending upon the reaction conditions and the composition of the reaction mixture, different zeolites can be formed even if the same organic species are used. For example, zeolites ZK-4, ZSM-4, faujasite and PHI, have all been prepared from tetramethylammonium solutions.

Although most experiments reported as producing nitrogenous zeolite have used fairly simple organic species such as tetra(n-alkyl)ammonium cations or alkylenediamines, several experiments are reported as using other organic species. U.S. Pat. No. 3,692,470, Ciric, Sept. 19, 1972, discloses preparing ZSM-10 from 1,4-dimethyl-1,4-diazoniabicyclo[2.2.2]octane. U.S. Pat. No. 3,783,124, Rubin et al., Jan. 1, 1974 discloses preparing a zeolite from benzyl trimethylammonium compounds. U.S. Pat. No. 3,832,449, Rosinski et al., Aug. 27, 1974, discloses preparing ZSM-12 from the reaction products of alkylene dihalides with complex amines or nitrogen heterocycles. U.S. Pat. No. 3,950,496, Ciric, Apr. 13, 1976, discloses preparing ZSM-18 from "tris" ammonium hydroxide (1,3,4,6,7,9-hexahydro-2,2,5,5,8,8-hexamethyl-2H-benzo[1,2-C:3,4-C':5,6-C"]tripyrolium trihydroxide). U.S. Pat. No. 4,000,248, Martin, Dec. 28, 1976, discloses preparing ferrierite using N-methylpyridine. U.S. Pat. No. 4,018,870, Whittam, Apr. 19, 1977, discloses preparing AG5 and AG6 using nitrogenous basic dyes. U.S. Pat. No. 4,251,499, Nanne, Feb. 17, 1981 discloses preparing ferrierite using piperidine or alkyl substituted piperidine. And, U.S. Pat. No. 4,285,922, Audeh, Aug. 25, 1981, discloses preparing ZSM-5 using 1-alkyl-4-aza-1-azaonia-bicyclo[2.2.2]octane-4-oxide halides.

While 1-amino adamantane has been used to crystallize an all-silica clathrasil (a non-porous crystalline silica), it has not been known previously to use these adamantane derivatives to prepare porous molecular sieves including zeolites.

SUMMARY OF THE INVENTION

The present invention is directed to an improved process for preparing crystalline molecular sieves using an adamantane compound as a template. The process is especially useful for preparing zeolites having a high silica to alumina ratio. In addition, the process allows the desired molecular sieves to be prepared at a lower temperature and with improved selectivity and purity. In its broadest aspect, the invention is a method for preparing a molecular sieve having a mole ratio of a first oxide selected from silicon oxide, germanium oxide, phosphorous oxide, and mixtures thereof to a second oxide selected from aluminum oxide, gallium oxide, boron oxide, iron oxide, and mixtures thereof of one or greater which comprises preparing an aqueous reaction mixture comprising a source of a first oxide selected from silicon oxide, germanium oxide, phosphorous oxide, and mixtures thereof, a second oxide selected from aluminum oxide, gallium oxide, iron oxide, boron oxide, and mixtures thereof, an alkali metal oxide and an adamantane compound as a templating agent, and maintaining said mixture under crystallization conditions until crystals of said molecular sieve are formed. The essential improvement in this process over the prior art processes is the use of an adamantane compound or a templating agent.

DETAILED DESCRIPTION OF THE INVENTION

In preparing a molecular sieve, especially a zeolite, according to the present invention, the adamantane compound acts as a template during crystallization.

Crystalline zeolites which may be prepared according to the process of this invention include ZSM-5, ZSM-21, ZSM-39, SSZ-13, SSZ-23, SSZ-24, SSZ-25, AlPO-5, and other similar materials. New crystalline molecular sieve structures may result as well by the present method.

The method of this invention for preparing crystalline molecular sieves can form such sieves in different crystalline forms depending on starting materials and reaction conditions. For example, factors which may effect the production of the crystalline form of alumina silicates formed include the specific adamantane template used, the silica-alumina mole ratio used, the concentration of water and alkali metal relative to the silica and/or alumina concentrations, temperature and time.

The molecular sieves can be suitably prepared from an aqueous solution containing sources of an alkali metal oxide, an adamantane compound as a template, an oxide of aluminum, gallium, iron, boron, or mixtures thereof, and an oxide of silicon, germanium, phosphorous, or mixtures thereof. The reaction mixture should have a composition in terms of mole ratios falling within the following ranges:

| | Mole Ratios |
|---|---|
| $YO_2/W_2O_3 =$ | $5-\infty$ |
| $OH^-/YO_2 =$ | 0.05–2.0 |
| $Q/YO_2 =$ | 0.05–2.0 |
| $M^+/YO_2 =$ | 0.05–2.0 |
| $H_2O/YO_2 =$ | 20–300 |
| $Q/QM^+ =$ | 0.1–0.90 | wherein Q is an adamantane compound such as disclosed below, Y is silicon, germanium, phosphorous, or mixtures thereof, and W is aluminum, gallium, iron, boron, or mixtures thereof. M is an alkali metal, preferably sodium or potassium. The organic template compound employed can provide hydroxide ion.

The organic component Q, of the crystallization mixture, is an adamantane compound. Preferably, the adamantane compound has the formula:

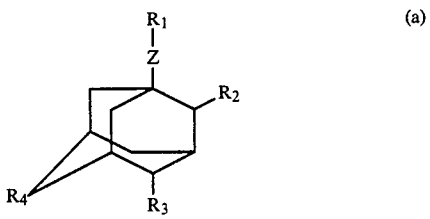

(a)

wherein Z is methylene or a covalent bond; $R_1$ is OH, $N(X_1X_2)$ wherein each of $X_1$ and $X_2$ independently is hydrogen or lower alkyl and most preferably hydrogen, or a moiety of the formula $N^{\oplus}(Y_1Y_2Y_3)A^{\ominus}$, wherein each of $Y_1$, $Y_2$ and $Y_3$ independently is lower alkyl and most preferably methyl or ethyl; and $A^{\ominus}$ is an anion which is not detrimental to the formation of the molecular sieve; $R_2$ is hydrogen or lower alkyl and most preferably hydrogen; each of $R_3$ and $R_4$ independently is hydrogen, lower alkyl, OH, $N(X_1,X_2)$ wherein $X_1$ and $X_2$ are as defined above, or a moiety of the formula $N^{\oplus}(Y_1Y_2Y_3)A^{\ominus}$ wherein each of $Y_1$, $Y_2$, $Y_3$ and $A^{\ominus}$ are as defined above and most preferably each of $R_3$ and $R_4$ is hydrogen; and

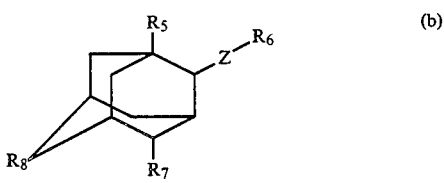

(b)

wherein Z is methylene or a covalent bond; $R_5$ is hydrogen or lower alkyl and most preferably hydrogen; $R_6$ is OH, $N(X_1X_2)$ wherein each of $X_1$ and $X_2$ independently is hydrogen or lower alkyl and most preferably hydrogen, or a moiety of the formula $N^{\oplus}(Y_1Y_2Y_3)A^{\ominus}$ wherein each of $Y_1$, $Y_2$ and $Y_3$ independently is lower alkyl and most preferably methyl or ethyl; and $A^{\ominus}$ is an anion which is not detrimental to the formation of the molecular sieve; each of $R_7$ and $R_8$ independently is hydrogen, lower alkyl, OH, $N(X_1X_2)$, wherein each of $X_1$ and $X_2$ independently is hydrogen or lower alkyl and most preferably hydrogen, or a moiety of the formula $N^{\oplus}(Y_1Y_2Y_3)A^{\ominus}$ wherein each of $Y_1$, $Y_2$ and $Y_3$ independently is lower alkyl and $A^{\ominus}$ is an anion which is not detrimental to the formation of the zeolite and most preferably each of $R_7$ and $R_8$ is hydrogen. By lower alkyl is meant an alkyl group containing from about 1 to 5 carbon atoms. When Z is a covalent bond, the groups represented by $R_1$ and $R_6$ are bound directly to the carbon atom present in the adamantane ring.

By lower alkyl is meant alkyl containing from about 1 to 5 carbon atoms. When Z is a covalent bond, the groups represented by $R_1$ and $R_6$ are bonded to the carbon in the adamantane ring.

$A^{\ominus}$ is an anion which is not detrimental to the formation of the zeolite. Representative of the anions include fluoride, chloride, bromide, hydroxide, acetate, sulfate, carboxylate, etc.

These adamantane compounds are commercially available or are prepared by methods known in the art.

When preparing such zeolites as ZSM-5, ZSM-21, and ZSM-39, it is preferable to use neutral derivatives of adamantane compounds as templates, for example, adamantane compounds wherein $R_1$ or $R_2$ is OH, or amino.

When preparing such zeolites as SSZ-13, SSZ-23, SSZ-24, and SSZ-25, it appears that adamantane quaternary ammonium compounds work well.

When using the adamantane quaternary ammonium hydroxide compound as a template, it has been found that purer forms of SSZ-23, SSZ-24, and SSZ-25 may be prepared when there is an excess of the adamantane template present relative to the amount of alkali metal hydroxide, and that when the $OH^-/SiO_2$ molar ratio is greater than 0.40, then $M^+/SiO_2$ molar ratio should be less than 0.20.

Typically, an alkali metal hydroxide, such as the hydroxide of sodium, potassium, lithium, cesium, and rubidium, is used in the reaction mixture; however, this component can be omitted so long as the equivalent basicity is maintained. Under some circumstances the adamantane can provide hydroxide ion.

The reaction mixture is prepared using standard zeolitic preparation techniques. Typical sources of aluminum oxide for the reaction mixture include aluminates, alumina, and aluminum compounds such as $AlCl_3$ and $Al_2(SO_4)_3$. Typical sources of silicon oxide include silicates, silica hydrogel, silicic acid, colloidal silica, tetra-alkyl orthosilicates, and silica hydroxides. Gallium, germanium, iron, phosphorous, and boron can be added in forms corresponding to their aluminum and silicon counterparts. Salts, particularly alkali metal halides, such as sodium chloride, can be added to or formed in the reaction mixture. They are disclosed in the literature as aiding the crystallization of zeolites while preventing silica occlusion in the lattice.

The present process is suitable for preparing "essentially alumina-free" zeolites, i.e., a product having a silica:alumina mole ratio of $\infty$. The term "essentially alumina-free" is used because it is difficult to prepare completely aluminum-free reaction mixtures for synthesizing these materials. Especially when commercial silica sources are used, aluminum is almost always present to a greater or lesser degree. The hydrothermal reaction mixtures from which the essentially alumina-free crystalline siliceous molecular sieves may be prepared can be referred to as being substantially alumina free. By this usage is meant that no aluminum is intentionally added to the reaction mixture, e.g., as an alumina or aluminate reagent, and that to the extent aluminum is present, it occurs only as a contaminant in the reagents. An additional method of increasing the mole ratio of silica to alumina is by using standard acid leaching or chelating treatments.

In preparing the molecular sieve according to the present invention, the reaction mixture is maintained at an elevated temperature until the crystals of the molecular sieve are formed. The temperatures during the hydrothermal crystallization step are typically maintained from about 100° C. to about 235° C., preferably from about 120° C. to about 165° C. The crystallization period is typically greater than 1 day and preferably from about 3 days to about 50 days.

The hydrothermal crystallization is usually conducted under pressure and usually in an autoclave so that the reaction mixture is subject to autogenous pressure. The reaction mixture can be stirred during crystallization.

Once the molecular sieve crystals have formed, the solid product is separated from the reaction mixture by standard mechanical separation techniques, such as filtration. The crystals are water-washed and then dried, e.g., at 90° C. to 150° C. for from 8 to 24 hours, to obtain the synthesized zeolite crystals. The drying step can be performed at atmospheric or subatmospheric pressures.

During the hydrothermal crystallization step, the crystals can be allowed to nucleate spontaneously from the reaction mixture. The reaction mixture can also be seeded with crystals both to direct, and accelerate the crystallization, as well as to minimize the formation of undesired aluminosilicate contaminants. If the reaction mixture is seeded with crystals, the concentration of the adamantane template can be somewhat reduced.

Zeolite ZSM-5 and the conventional preparation thereof are described in U.S. Pat. No. 3,702,886, the disclosure of which is incorporated herein by reference. Other preparations for ZSM-5 are described in U.S. Pat. Nos. RE 29948; 4,100,262; and 4,139,600, the disclosures of which are incorporated herein by reference. Zeolite ZSM-21 and the conventional preparation thereof are described in U.S. Pat. No. 4,046,859, the disclosure of which is incorporated herein by reference. Zeolite ZSM-39 and the conventional preparation thereof are described in U.S. Pat. No. 4,357,233, the disclosure of which is incorporated herein by reference. Zeolite SSZ-13 and the conventional preparation thereof are described in U.S. Pat. No. 4,544,538, the disclosure of which is incorporated herein by reference. Molecular sieve AlPO-5 and the conventional preparation thereof are disclosed in U.S. Pat. No. 4,310,440, the disclosure of which is incorporated herein by reference. Zeolite SSZ-23 and the conventional preparation thereof are described in copending application U.S. Ser. No. 823,705, titled "New Zeolite SSZ-23" (filed concurrently herewith), the disclosure of which is incorporated herein by reference. Zeolite SSZ-24 and the conventional preparation thereof are described in copending application U.S. Ser. No. 823,704, titled "New Zeolite SSZ-24" (filed concurrently herewith), the disclosure of which is incorporated herein by reference. Zeolite SSZ-25 and the conventional preparation thereof are described in copending application U.S. Ser. No. 823,698, titled "New Zeolite SSZ-25" (filed concurrently herewith), the disclosure of which is incorporated herein by reference.

The synthetic molecular sieve or zeolite can be used as synthesized or can be thermally treated (calcined). Usually, it is desirable to remove the alkali metal cation by ion exchange and replace it with hydrogen, ammonium, or any desired metal ion. The zeolite can be leached with chelating agents, e.g., EDTA or dilute acid solutions, to increase the silica:alumina mole ratio. The zeolite can also be steamed; steaming helps stabilize the crystalline lattice to attack from acids. The zeolite can be used in intimate combination with hydrogenating components, such as tungsten, vanadium, molybdenum, rhenium, nickel, cobalt, chromium, manganese, or a noble metal, such as palladium or platinum, for those applications in which a hydrogenation-dehydrogenation function is desired. Typical replacing cations can include metal cations, e.g., rare earth, Group IIA and Group VIII metals, as well as their mixtures. Of the replacing metallic cations, cations of metals such as rare earth, Mn, Ca, Mg, Zn, Cd, Pt, Pd, Ni, Co, Ti, Al, Sn, and Fe are particularly preferred.

The hydrogen, ammonium, and metal components can be exchanged into the zeolite. The zeolite can also be impregnated with the metals, or, the metals can be physically intimately admixed with the zeolite using standard methods known to the art. And the metals can be occluded in the crystal lattice by having the desired metals present as ions in the reaction mixture from which the zeolite is prepared.

Typical ion exchange techniques involve contacting the synthetic zeolite with a solution containing a salt of the desired replacing cation or cations. Although a wide variety of salts can be employed, chlorides and other halides, nitrates, and sulfates are particularly preferred. Representative ion exchange techniques are disclosed in a wide variety of patents including U.S. Pat. Nos. 3,140,249; 3,140,251; and 3,140,253. Ion exchange can take place either before or after the zeolite is calcined.

Following contact with the salt solution of the desired replacing cation, the zeolite is typically washed with water and dried at temperatures ranging from 65° C. to about 315° C. After washing, the zeolite can be calcined in air or inert gas at temperatures ranging from about 200° C. to 820° C. for periods of time ranging from 1 to 48 hours, or more, to produce a catalytically active product especially useful in hydrocarbon conversion processes.

Regardless of the cations present in the synthesized form of the zeolite, the spatial arrangement of the atoms which form the basic crystal lattice of the zeolite remains essentially unchanged. The exchange of cations has little, if any, effect on the zeolite lattice structures.

The aluminosilicate can be formed into a wide variety of physical shapes. Generally speaking, the zeolite can be in the form of a powder, a granule, or a molded product, such as extrudate having a particle size sufficient to pass through a 2-mesh (Tyler) screen and be retained on a 400-mesh (Tyler) screen. In cases where the catalyst is molded, such as by extrusion with an organic binder, the aluminosilicate can be extruded before drying, or, dried or partially dried and then extruded.

The zeolite can be composited with other materials resistant to the temperatures and other conditions employed in organic conversion processes. Such matrix materials include active and inactive materials and synthetic or naturally occurring zeolites as well as inorganic materials such as clays, silica and metal oxides. The latter may be naturally occurring or may be in the form of gelatinous precipitates, sols, or gels, including mixtures of silica and metal oxides. Use of an active material in conjunction with the synthetic zeolite, combined with it, can improve the conversion and selectivity of the catalyst in certain organic conversion processes. Inactive materials can serve as diluents to control the amount of conversion in a given process so that products can be formed economically without using other means for controlling the rate of reaction. Frequently, zeolite materials have been incorporated into naturally occurring clays, e.g., bentonite and kaolin. These materials, i.e., clays, oxides, etc., function, in part, as binders for the catalyst. It is desirable to provide a catalyst having good crush strength and attrition resistance, because in petroleum refining the catalyst is often subjected to rough handling. This tends to break the catalyst down into powders which cause problems in processing.

Naturally occurring clays which can be composited with the synthetic zeolites of this invention include the montmorillonite and kaolin families, which families include the sub-bentonites and the kaolins commonly known as Dixie, McNamee, Georgia and Florida clays or others in which the main mineral constituent is halloysite, kaolinite, dickite, nacrite, or anauxite. Fibrous clays such as sepiolite and attapulgite can also be used as supports. Such clays can be used in the raw state as originally mined or can be calcined, treated with acid, or chemically modified.

In addition to the foregoing materials, the zeolite can be composited with porous matrix materials and mixtures of matrix materials such as silica, alumina, titania, magnesia, silica-alumina, silica-magnesia, silica-zirconia, silica-thoria, silica-beryllia, silica-titania, titania-zirconia as well as ternary compositions such as silica-alumina-thoria, silica-alumina-zirconia, silica-alumina-magnesia and silica-magnesia-zirconia. The matrix can be in the form of a cogel.

The zeolite can also be composited with other zeolites such as synthetic and natural faujasites (e.g., X and Y), erionites, and mordenites. They can also be composited with purely synthetic zeolites. The combination of zeolites can also be composited in a porous inorganic matrix.

A number of adamantane templates were prepared which are suitable for synthesizing molecular sieves, especially zeolites.

The following examples demonstrate but do not limit the present invention.

EXAMPLES

Example 1

1-Adamantamine (Aldrich Chemical Company), 10 g, was dissolved in 60 ml of dimethyl formamide. Twenty-nine g of tributylamine was added; 28.4 g of methyl iodide was added dropwise while the reaction was stirred in an ice bath. The next day, large platelike crystals had formed. These were filtered after five days and washed with diethyl ether. Microanalysis for C, H, and N showed the product to be the trimethyl derivative, N,N,N-trimethyl-1-adamantammonium iodide.

Example 2

2-Adamantanone, 35 g (Aldrich Chemical Company), Formic Acid (88%), 18.55 g, and 31.5 g of dimethyl formamide were mixed together and placed in a Parr 2-liter stainless steel pressure reactor and heated for 16 hours at 190° C. Care must be taken to provide for the pressure that develops in the reactor both as a result of the reactants at 190° C. and as a consequence of $CO_2$ being generated as a by-product. Upon cooling the reaction, the crude dimethylamine was treated with 500 g $H_2O$ and then extracted once with 400 cc ether in a separatory funnel. Additional product was obtained by adjusting the pH of the aqueous phase to 12.7 with ~13 g of 50% NaOH. Four more extractions at 400 cc each were carried out. The extracts were combined and dried over $Na_2SO_4$. The dried extract was stripped down yielding ~40 g of a mixed oil/solid phase. This mixture was dissolved in 150 cc of ethyl acetate, cooled in an ice bath and a two- to threefold excess of methyl iodide was added dropwise with the reaction stirred and slowly allowed to come to room temperature. Over several days, product continued to precipitate from solution and was collected, washed with ether, and dried to give N,N,N-trimethyl-2-adamantammonium iodide.

Example 3

Forty-three g of the product obtained in Example 3 was slurried with 100 cc $H_2O$ and 16.08 g (69 mmoles) $Ag_2O$ and stirred for several hours at room temperature. Filtering off the silver halide produces about a 70% yield of the corresponding adamantane quaternary ammonium hydroxide at a concentration of 0.98 molar (by titration). Additional product was obtained by stirring the filter solids with more water overnight. The overall yield was greater than 90%. In a similar manner the product obtained in Example 1 was converted to the corresponding hydroxy form.

In the examples below, the following templates were used to make molecular sieves. The template molecules are designated A, B, C, etc., and are given in the following table:

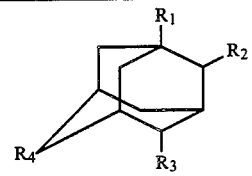

| Template | $R_1$ | $R_2$ | $R_3$ | $R_4$ | Cation |
|---|---|---|---|---|---|
| A | $Me_3N^+$ | H | H | H | I |
| B | $Me_3N^+$ | H | H | H | OH |
| C | H | $Me_3N^+$ | H | H | OH |
| D | $NH_2$ | H | H | H | — |
| E | H | $N(CH_3)_2$ | H | H | — |
| F | $Me_3N^+CH_2$ | H | H | H | OH |
| G | OH | H | H | H | — |
| H | H | OH | H | H | — |

Templates A, B, C, and D were prepared according to Examples 1, 2, and 3. The remaining templates were commercially available.

Example 4

The following procedure illustrates the preparation of SSZ-13, using N,N,N-trimethyl-1-adamantammonium iodide (Template A) as the organic templating species.

Into a 23-ml Teflon cup designed to fit into a stainless steel pressure reactor (Parr Chemical Company), a first solution was prepared by adding 5 g of sodium silicate solution (0.45 g $Na_2O$, 1.46 g $SiO_2$, 3.10 g $H_2O$), 6 ml of $H_2O$, and 1.56 g of N,N,N-trimethyl-1-adamantammonium iodide. A second solution prepared using 0.24 g of $Al_2(SO_4)_3.16H_2O$ and 0.67 g of concentrated (50% by weight) NaOH solution in 6 ml of water was added to the first solution. The reactants were stirred until a homogeneous milky solution was obtained. The reactor was closed and heated for six days at 140° C. and autogenous pressure. Upon cooling, the contents of the Teflon cup were poured into a filter and the resulting solids were washed five times with deionized $H_2O$ followed by once each with methanol and acetone. The X-ray diffraction pattern for the air-dried zeolite was shown to correspond to zeolite SSZ-13.

Example 5

SSZ-13 was prepared from a reaction mixture containing potassium rather than sodium. A solution was prepared from 5.1 g of Ludox AS-30, 2.0 g of N,N,N-trimethyl-1-adamantammonium iodide (Template A), 12.1 ml of water, 0.4 g of $Al_2(SO_4)_3.18H_2O$, and 1.09 g solid potassium hydroxide. The solution was poured into the Teflon cup of a Parr 4545 reactor, and the reactor closed and sealed. The reactor was heated for six days at 150° C. under autogenous pressure while being rotated at 30 rpm. After cooling, the contents were filtered, and the solids were washed five times with water and once each with methanol and acetone. The resulting zeolite was dried in air. Its X-ray diffraction pattern was obtained and it was shown to correspond to pure zeolite SSZ-13.

Example 6

Nine ml of a 0.22 molar solution of N,N,N-trimethyl-1-adamantammonium hydroxide (Template B) was mixed with 0.09 g solid NaOH and 0.06 g of $Al_2(SO_4)_3.18H_2O$. 0.60 g of Cabosil M5 were stirred in and the thin gel was placed in the Teflon cup of a Parr 4745 reactor (23-ml cup). The reaction was heated at 180° C. under autogenous pressure with 30 ppm tumbling for six days. Upon cooling the reaction, the solids were filtered and washed ~1 liter of water and air dried. X-ray diffraction shows the product to be 100% SSZ-13.

Example 7

Sixteen ml of a 0.25 molar solution of Template B was used to dissolve 0.26 g of KOH(s) and 0.12 g $Al_2(SO_4)_3.18H_2O$. One and twenty-one hundredths g of Cabosil M5 was added to the clear solution and the reaction mixture was treated as in Example 8 except the run time was seven days at 175° C. The product was analyzed by X-ray diffraction and shown to be SSZ-23 as the major product with a minor component of SSZ-13.

Example 8

0.087 Grams of KOH (solid), 0.06 gms of $Al_2(SO_4)_3.18H_2O$ and 5 grams of a 0.74 molar solution of Template B were dissolved in 4 ml of $H_2O$ containing 4 micromoles of methylene Blue Dye. 0.60 Grams of Cabosil M5 was stirred in. The reaction was sealed in the Teflon liner of a Parr 4745 reactor and heated for 7 days at 30 rpm at the reaction temperature of 160° C. The cooled reaction was opened and the fine white solids are recovered by filtration. After working with copious quantities of distilled water, the product was air-dried overnight. After drying at 100° C. analysis by the X-ray diffraction pattern shows the material to be pure SSZ-23. The ratio of reactants in this run were:

$Si:O_2/Al_2O_3 = 100$
$KOH/SiO_2 = 0.13$
TEMPLATE $OH^-/SiO_2 = 0.37$
$H_2O/SiO_2 = 44$
net $OH^-/SiO_2 = 0.45$ The most frequently encountered impurity in the preparation of zeolite SSZ-23 can be zeolite SSZ-13. To minimize the formation of the latter zeolite, I have found it advantageous to (a) exclude $Na^+$ ion from the preparation and (b) to use methylene Blue at a level of methylene $Blue/Al_2O_3 = 4.4 \times 10^{-2}$. The methylene Blue is known to inhibit the nucleation of certain zeolite phases (Whittam et al British Pat. No. 1,450,411) and because zeolite SSZ-13 is a high silica chabazite structure, this particular dye seems to be effective in preventing its crystallization in zeolite SSZ-23 syntheses.

In a similar manner, Template C may be substituted for Template B above to produce SSZ-23.

Example 9

A gel was prepared from 1.48 g KOH(s), 6.8 g Cabosil M5 and 50 g $H_2O$. To 10 g of this gel was added 0.12 g $Al_2(SO_4)_3.18H_2O$ dissolved in 10 ml of 0.3 molar Template B. The resulting mixture was heated at 175° C. for six days. The product by X-ray diffraction was found to be SSZ-23 with trace of ZSM-5 zeolite.

Example 10

A reaction solution was formed from mixing the following reagents. 0.13 Grams of KOH(s) was dissolved in 11.6 ml $H_2O$ containing 4.2 gms of Template B (0.71M) solution. 1.20 gms of Cabosil M5 was added with stirring. A pea-shaped teflon-coated stir bar was used and kept in the vessel during reaction. The synthetic reaction was carried out in a Parr 4745 reactor at 160° C. for 6 days. The reactor was mounted onto a spit in a Blue M oven and rotated at 30 rpm. After cooling the reactor, the contents were poured into a filter and washed repeatedly with distilled water. After drying the sample in air and then at 100° C., the product was examined by X-ray diffraction (XRD) and found to be zeolite SSZ-24.

Example 11

In this example aluminum was incorporated into the framework of the zeolite. A reaction mixture was put together as in Example 10. This time 0.06 gms of $Al_2(SO_4)_3.18H_2O$ was also added to the reaction. Care was taken to obtain good dispersion of the aluminum upon mixing so that aluminum-rich gradients are minimized. The $SiO_2/Al_2O_3$ ratio in the synthesis mixture was 200. The crystalline products obtained from carrying out the reaction as in Example 10 are SSZ-24 (major component) and the Kenyaiite-like phase (minor component).

Example 12

Eight and four one hundredths g of a 0.3 molar solution of N,N,N-trimethyl-2-adamantanammonium hydroxide (Template C) was used to dissolve 0.24 g KOH (solid) and 0.10 g of sodium aluminate (Fischer, $Na_2O.Al_2O_3.3H_2O$). Eighty-seven hundredths g of Cabosil M5 was added. Three ml of $H_2O$ were added. $SiO_2/Al_2O_3$ of the reactants was about 30. The reaction was heated at 170° C. for 12 days with 30 rpm tumbling; the product was worked up by filtering, washing with distilled water, drying in air and then at 100° C. By X-ray diffraction, the sample was shown to be zeolite SSZ-25. When the sample of SSZ-25 was calcined to 1100° F.

(two-hour increments at 200° F., 400° F., 600° F., 800° F., and then eight hours at 1000° F., four hours at 1100° F.) to remove the organic components, the X-ray diffraction pattern showed the zeolite to be intact. The material had a surface area of 500 m²/g determined by the BET method using nitrogen. All the pores are microporous, with a pore volume of 0.19 cc/g.

EXAMPLE 13

6.02 Grams of a 0.71M solution of Template B were mixed with 0.14 gms KOH(s), 0.088 gms of Reheis F-2000 hydrated alumina, and 8 ml H₂O. After thorough mixing 4.0 gms of Ludox AS-30 was blended in as silica source. The reaction mixture was heated in the telfon cup of a Parr 4745 reactor at 175° C. at 45 rpm for 7 days. Workup as in Example 10 produced crystalline SSZ-25.

Example 14

In this example the same reactants were used as in Example 12 but the initial SiO₂/Al₂O₃ ratio was increased to 75. 0.051 of Reheis F-2000 hydrated alumina was used and dissolved in the same quantity KOH, 6.4 gms of the same Template B solution and 6.8 ml H₂O. The same quantity of Ludox was used and the reaction was again run at 175° C. but at 30 rpm. At 7 days of reaction the product was largely amorphous but by 10 days of reaction the product was crystalline SSZ-25. The SiO₂/Al₂O₃ value of the zeolite is 75.

Example 15

3.00 Grams of a 1.04M solution of Template B was mixed with 9 ml of H₂O, 0.195 gms of KOH(s), 0.083 gms of Reheis F-2000 hydrated alumina, and finally 0.90 gms of Cabosil M5. The mixture was heated at 175° C. for 7 days without agitation. The crystalline product was SSZ-25 and has a SiO₂/Al₂O₃ ratio of 30.

Example 16

0.32 g of 1-adamantanamine (Aldrich) (Template D) was mixed with 9 ml H₂O and 0.12 g of NaOH(s). 0.63 g of Cabosil M5 was added along with 0.06 g of Al₂(SO₄)₃.18H₂O. The mixture was heated in a Parr 4745 Teflon-lined reactor at 175° C. while rotating at 45 rpm. The run lasted six days. After the usual workup, an X-ray diffraction analysis shows the product to be ZSM-5 and non-zeolitic tridymite-type impurity.

Example 17

1.10 g of 2-dimethylamino adamantane (Template E) were mixed with 7 ml of H₂O, 0.20 g of KOH(s), and 0.10 g of sodium aluminate (Na₂.Al₂O₃.3H₂O). The dissolved mixture was then blended with 0.90 g of Cabosil M5 and heat at 170° C. with 30 rpm tumbling for six days. The zeolite product was ZSM-21 along with some non-zeolitic tridymite-type impurity.

Example 18

A commercially available adamantane compound of the formula:

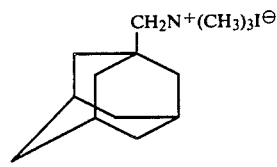

was ion-exchanged using silver oxide thereby converting the iodide salt into the hydroxide form (Template F). 3.5 g of a 0.43 m solution of the hydroxide was added to 4.5 ml H₂O, 0.13 g KOH(s), and 0.06 g of the sodium aluminate. 0.60 g of Cabosil M5 was added in and the reaction was run as the previous example above. The starting SiO₂/Al₂O₃ ratio is 37 and zeolite ZSM-5 is the crystalline product.

Example 19

A reaction was set up like the one above except the starting SiO₂/Al₂O₃ ratio was raised to 110. The product was once again crystalline ZSM-5. The flexibility for the use of this template at variable SiO₂/Al₂O₃ values is demonstrated by these two runs.

Example 20

One g of 1-adamantanol (Aldrich Chemical Company) (Template G) was mixed with 6 ml H₂O and 5 g of Banco "N" silicate (38.3% solids with SiO₂/Na₂O=3.22). A second solution containing 0.16 g of Al₂(SO₄)₃.18H₂O, 0.30 g of H₂SO₄ and 6 ml H₂O was added. With stirring a gel forms which was then heated at 160° C. and 30 rpm for five days. The crystalline products were shown by X-ray diffraction analysis to be ZSM-39 and the layered sodium silicate Magadiite.

Example 21

This experiment was run analogously to the previous run, substituting 2-adamantanol (Template H) for 1-adamantanol. The crystalline products obtained were determined by X-ray diffraction analysis to be ZSM-5 and Magadiite.

Example 22

Ten g of a 0.68 molar solution of Template B was mixed with 0.964 g SA pseudo boemite (as alumina source) and 1.59 g of 85% H₃PO₄. The resulting mixture had an initial pH of 2.4 at room temperature. The reaction mixture was stirred at 30 rpm and heated for 48 hours at 150° C. The crystalline product after workup analyzed as AlPO-5 by X-ray diffraction.

The X-ray diffraction pattern for SSZ-24 and AlPO-5 are essentially the same. Unit cell parameters for SSZ-24 and AlPO-5 are given below in the Table below.

|   | AlPO-5 | SSZ-24 As Prepared | SSZ-24 Calcined |
| --- | --- | --- | --- |
| a = | 13.726 | 13.62 | 13.62 |
| c = | 8.484 | 8.296 | 8.324 |

The X-ray powder diffraction patterns for the dried solids were determined using standard techniques. The radiation was K-alpha/doublet of copper and a scintillation counter spectrometer with a strip-chart pen recorder was used. The peak heights I and the positions, as a function of 2θ, where θ is the Bragg angle, were read from the spectrometer chart. From these measured values, the relative intensities, 100 $I/I_o$, where $I_o$ is the intensity of the strongest line or peak, and d, the interplanar spacing in Angstroms corresponding to the recorded lines, can be calculated.

What is claimed is:

1. In a method for preparing a molecular sieve having a mole ratio of a first oxide selected from silicon oxide, germanium oxide, phosphorous oxide, and mixtures thereof to a second oxide selected from aluminum oxide, gallium oxide, iron oxide, boron oxide, and mixtures thereof of one or greater which process comprises preparing an aqueous reaction mixture comprising a source of a first oxide selected from silicon oxide, germanium oxide, phosphorous oxide, and mixtures thereof, a second oxide selected from aluminum oxide, gallium oxide, iron oxide, boron oxide, and mixtures thereof, an alkali metal oxide and an organic templating compound and maintaining said mixture under crystallization conditions until crystals of said molecular sieve are formed, the improvement wherein said organic templating compound is an adamantane compound wherein the adamantane compound has the formula:

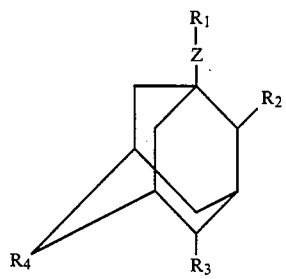

wherein Z is methylene or a covalent bond; $R_1$ is OH, $N(X_1X_2)$ wherein each of $X_1$ and $X_2$ independently is hydrogen or lower alkyl, or a moiety of the formula $N^{\oplus}(Y_1Y_2Y_3)A^{\ominus}$, wherein each of $Y_1$, $Y_2$ and $Y_3$ independently is lower alkyl and $A^{\ominus}$ is an anion which is not detrimental to the formation of the molecular sieve; $R_2$ is hydrogen or lower alkyl; each of $R_3$ and $R_4$ independently is hydrogen, lower alkyl, OH, $N(X_1,X_2)$ wherein $X_1$ and $X_2$ are as defined above, or a moiety of the formula $N^{\oplus}(Y_1Y_2Y_3)A^{\ominus}$ wherein each of $Y_1$, $Y_2$, $Y_3$ and $A^{\ominus}$ are as defined above; and

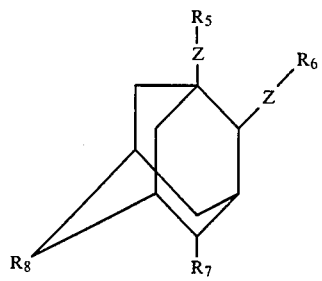

wherein Z is methylene or a covalent bond; $R_5$ is hydrogen or lower alkyl; $R_6$ is OH, $N(X_1X_2)$ wherein each of $X_1$ and $X_2$ independently is hydrogen or lower alkyl, or a moiety of the formula $N^{\oplus}(Y_1Y_2Y_3)^{\ominus}$ wherein each of $Y_1$, $Y_2$ and $Y_3$ independently is lower alkyl and $A^{\ominus}$ is an anion which is not detrimental to the formation of the molecular sieve; each of $R_7$ and $R_8$ is hydrogen, lower alkyl, OH, $N(X_1X_2)$, wherein each of $X_1$ and $X_2$ are as defined above, or a moiety of the formula $N^{\oplus}(Y_1Y_2Y_3)^{\ominus}$ wherein each of $Y_1$, $Y_2$ and $Y_3$ and $A^{\ominus}$ are as defined above.

2. The method according to claim 1 wherein the source of the first oxide is selected from silicon oxide and the source of the second oxide is selected from aluminum oxide.

3. The method according to claim 1 wherein in formula (a) $R_1$ is a moiety of the formula $N^{\oplus}(Y_1Y_2Y_3)A^{\ominus}$ wherein each of $Y_1$, $Y_2$ and $Y_3$ independently is lower alkyl and $A^{\ominus}$ is an anion which is not detrimental to the formation of the molecular sieve; and each of $R_2$, $R_3$, and $R_4$ is hydrogen; and in formula (b) $R_6$ is a moiety of the formula $N^{\oplus}(Y_1Y_2Y_3)A^{\ominus}$ wherein each of $Y_1$, $Y_2$ and $Y_3$ independently is lower alkyl; and $A^{\ominus}$ is an anion which is not detrimental to the formation of the molecular sieve; and each of $R_5$, $R_7$ and $R_8$ is hydrogen.

4. The method according to claim 3 wherein in the formulae (a) and (b), Z is a covalent bond; $Y_1$, $Y_2$ and $Y_3$ are the same and each is methyl; and $A^{\ominus}$ is OH or halogen.

5. The method according to claim 3 wherein in the formulae (a) and (b) Z is methylene; $Y_1$, $Y_2$ and $Y_3$ are the same and each is methyl; and $A^{\ominus}$ is OH or halogen.

6. The method according to claim 1 wherein in the formula (a) $R_1$ is OH; and each of $R_2$, $R_3$ and $R_4$ is hydrogen; and in the formula (b) $R_6$ is OH; and each of $R_5$, $R_7$ and $R_8$ is hydrogen.

7. The method according to claim 6 wherein in the formula (a) and (b) Z is a covalent bond.

8. The method according to claim 6 wherein in the formula (a) and (b) Z is methylene.

9. The method according to claim 1 wherein in the formula (a) $R_1$ is $N(X_1X_2)$ wherein $X_1$ and $X_2$ independently is hydrogen or lower alkyl and each of $R_2$, $R_3$ and $R_4$ is hydrogen; and in the formula (b) $R_6$ is $N(X_1,X_2)$ wherein $X_1$ and $X_2$ independently is hydrogen or lower alkyl and each of $R_5$, $R_7$ and $R_8$ is hydrogen.

10. The method according to claim 9 wherein in the formulae (a) and (b) Z is a covalent bond.

11. The method according to claim 10 wherein in the formulae (a) and (b) Z is methylene.

* * * * *